(12) United States Patent
Sundaram et al.

(10) Patent No.: US 9,037,702 B2
(45) Date of Patent: May 19, 2015

(54) FACILITATING MESSAGE SERVICES USING MULTI-ROLE SYSTEMS

(75) Inventors: Naresh Sundaram, Redmond, WA (US);
Greg Thiel, Black Diamond, WA (US);
Robin Thomas, Kirkland, WA (US);
Harvey Rook, Newcastle, WA (US);
Yogesh Bansal, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 325 days.

(21) Appl. No.: 13/356,868

(22) Filed: Jan. 24, 2012

(65) Prior Publication Data
US 2013/0191465 A1 Jul. 25, 2013

(51) Int. Cl.
*G06F 15/173* (2006.01)
*H04L 12/26* (2006.01)
*H04L 12/58* (2006.01)

(52) U.S. Cl.
CPC ............ *H04L 43/0817* (2013.01); *H04L 51/00* (2013.01)

(58) Field of Classification Search
USPC .......................... 709/206, 224, 204; 715/753
See application file for complete search history.

(56) References Cited

U.S. PATENT DOCUMENTS

| | | | |
|---|---|---|---|
| 5,768,513 A * | 6/1998 | Kuthyar et al. | 709/204 |
| 7,228,453 B2 | 6/2007 | O'Brien et al. | |
| 7,657,780 B2 | 2/2010 | D'Souza et al. | |
| 8,127,001 B1 * | 2/2012 | Sylvain | 709/224 |
| 2007/0220553 A1 * | 9/2007 | Branam et al. | 725/46 |
| 2008/0114839 A1 * | 5/2008 | Borgendale | 709/206 |

OTHER PUBLICATIONS

"The Spread Toolkit;" 2009; p. 1; Spread Concepts LLC; http://www.spread.org/.
Boris Lublinsky; "Versioning in SOA;" 2011; pp. 1-11; Microsoft; http://msdn.microsoft.com/en-us/library/bb491124.aspx.
"Understanding Oracle Service Bus High Availability;" Deployment Guide; 2008; pp. 1-6; Oracle Corporation; http://docs.oracle.com/cd/E13159_01/osb/docs10gr3/deploy/highav.html.
Deepti Parachuri, et al.; "Service Versioning in SOA;" Infosys White Paper; Dec. 2008; pp. 1-7; Infosys Limited; http://www.infosys.com/consulting/soa-services/white-papers/Documents/service-versioning-SOA-2.pdf.
Tony Smith; "How to Build a Scalable and Available Unified Messaging System;" TechNet; May 15, 2007; pp. 1-7; Microsoft; http://technet.microsoft.com/en-us/library/bb508900(EXCHG.80).aspx.

* cited by examiner

*Primary Examiner* — Kyung H Shin
(74) *Attorney, Agent, or Firm* — Louise Bowman; Raghu Chinagudabha; Micky Minhas

(57) ABSTRACT

Systems, methods, and software are provided for facilitating a message service. A multi-role system is identified based on where an active message database associated with a user identity resides. Service communications generated by a messaging client associated with the user identity are directed from an entry system to the multi-role system for handling in the multi-role system by a messaging server and a content server to provide the message service.

20 Claims, 6 Drawing Sheets

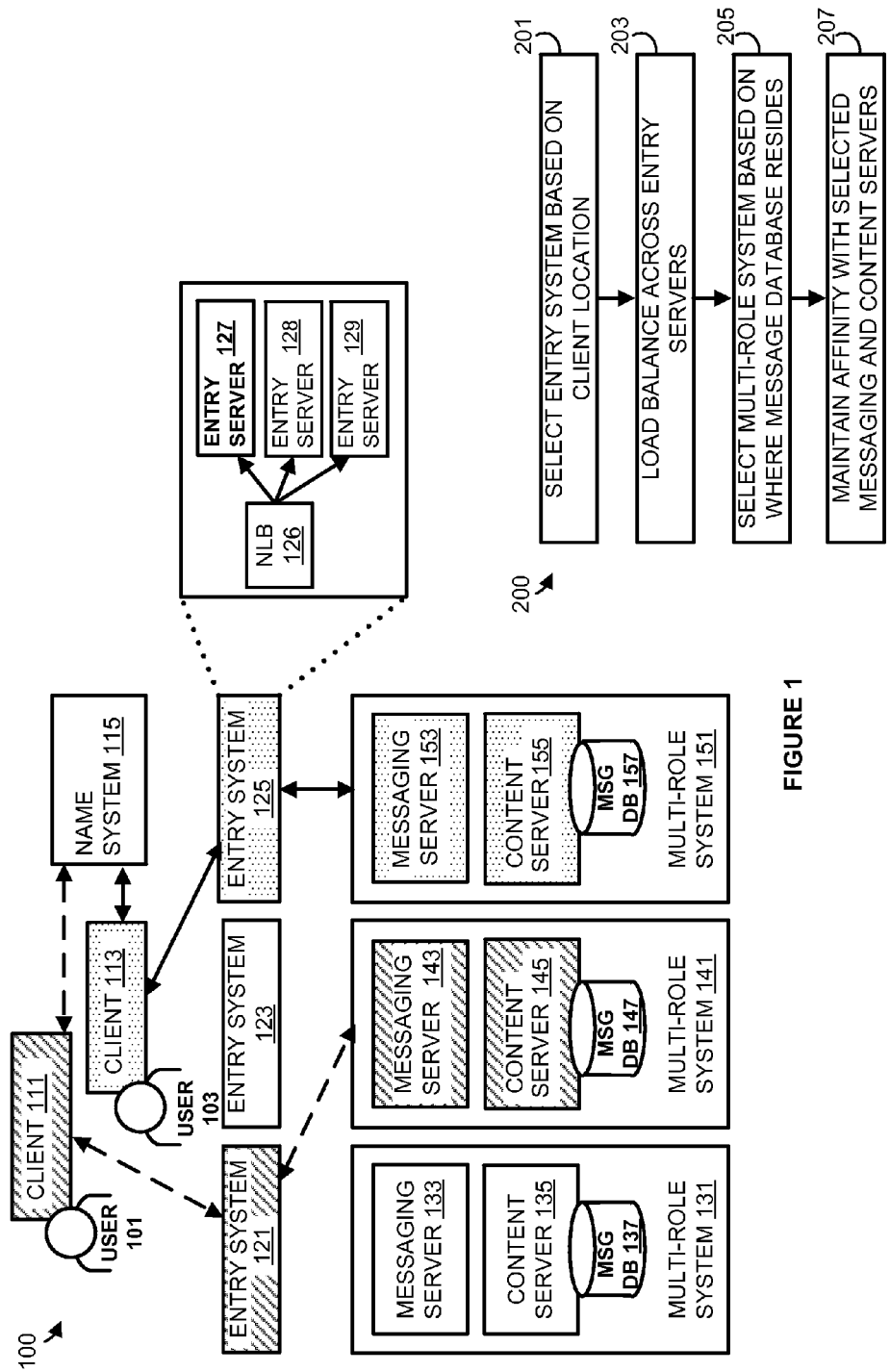

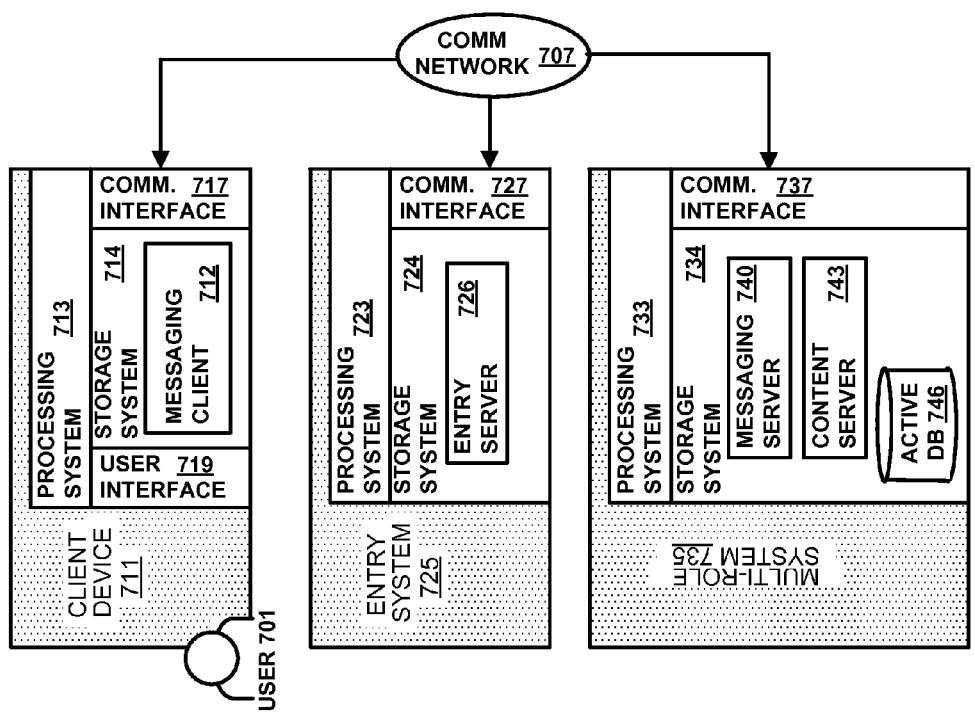

FACILITATING MESSAGE SERVICES USING MULTI-ROLE SYSTEMS

TECHNICAL FIELD

Aspects of the disclosure are related to communication services, and in particular, to highly reliable and scalable messaging services.

TECHNICAL BACKGROUND

In the fields of computing and communications, users have become accustomed to ubiquitous access to their messages and messaging services. For instance, email can now be accessed on nearly any kind of communication device from almost any location. Likewise, unified communication technologies allow users to take and place phone calls and check voicemail through a variety of platforms, often integrated with their email.

Providing such high levels of availability and reliability at scale requires coordination across many systems and processes, which alone is a difficult task. Added to this are the challenges of keeping up with evolving technology and increased expectations. For example, users have come to expect access to messaging services not just from any device or location, but at any time and with the same rich features and responsiveness.

In response, some messaging services have evolved very complex architectures to provide these levels of availability and reliability. However, as services scale, such complexity can frustrate the development and deployment of new features and hinder maintenance and updates. For example, some email services call for very modular architectures that distribute messaging servers and content servers, and their associated roles, across diverse sets of server systems. While these modular arrangements have many advantages, they can lead to so much inter-server communication that a problem with just one component can negatively impact many others, thereby leading to sub-optimal user experiences.

OVERVIEW

Provided herein are systems, methods, and software that improve messaging services by utilizing multi-role systems having messaging servers and content servers residing therein to provide the messaging services to clients. Affinity is achieved by routing service communications via entry systems to the appropriate multi-role systems based on where messages associated with users may reside. Deploying multi-role systems allows for high availability and reliability while accommodating maintenance and upgrades.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a messaging system in an implementation.

FIG. 2 illustrates a method for operating a messaging system.

FIG. 7 illustrates a computing environment in an implementation.

TECHNICAL DISCLOSURE

Figure 3:
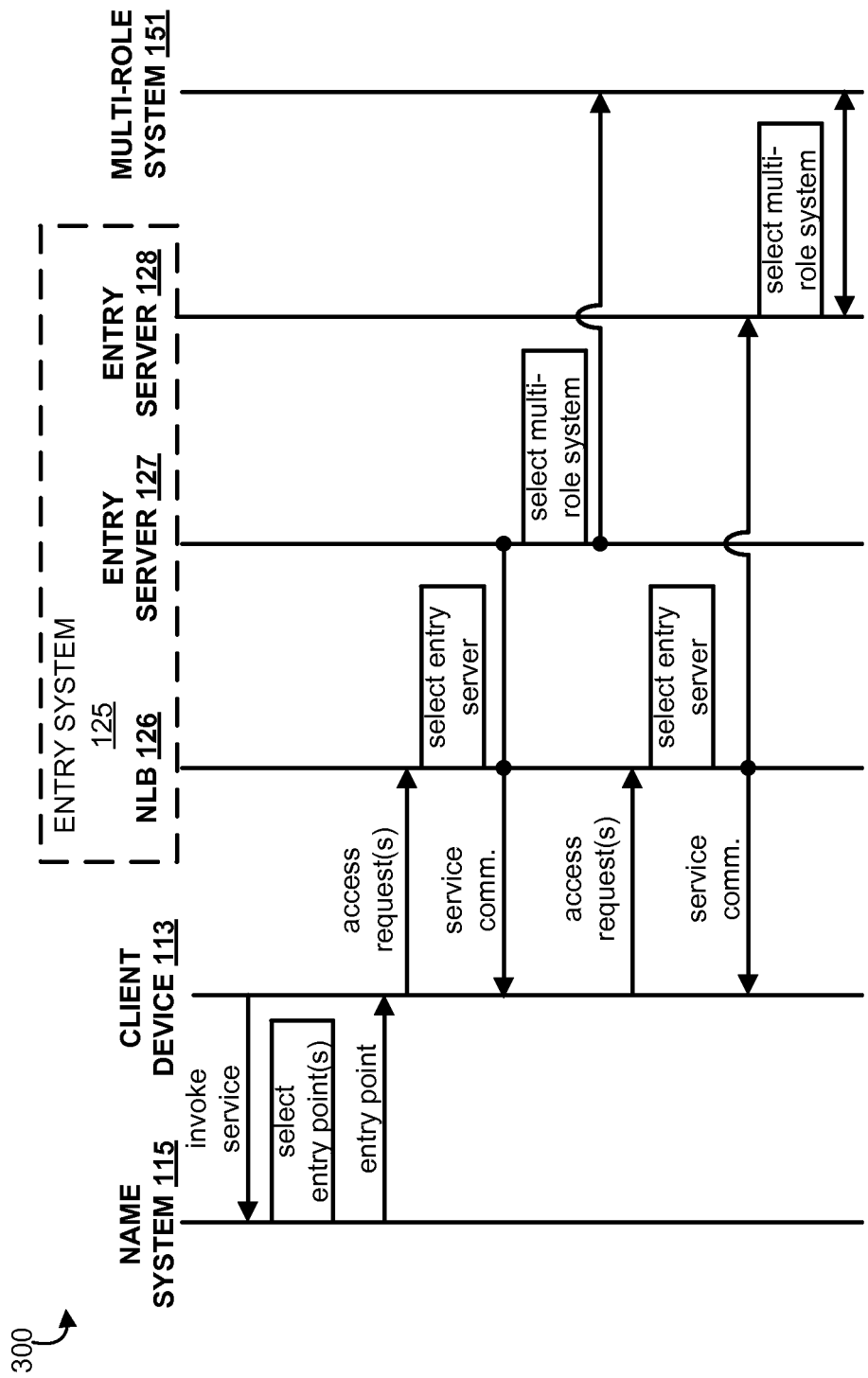
FIG. 3 is sequence diagram illustrating the operation of a messaging system.

Implementations described herein provide for highly available and reliable messaging services at scale using multi-role systems that have both messaging servers and content servers integrated therein. Deploying messaging servers and content servers that reside together in the same multi-role systems reduces overall complexity in the messaging architecture while enforcing affinity across the messaging service for any given client. Indeed, multiple versions of and changes to a messaging service can be supported in a reliable manner by way of the multi-role systems without requiring overly complex validation processes.

For example, in some implementations email clients are directed to the appropriate multi-role system based on where among the multi-role systems their mailboxes that can be accessed are located. In an active/passive replication system, the same multi-role system that hosts a user's active mailbox thus also hosts the protocol server and mailbox server that will provide the messaging service to the user. In this manner, any given multi-role system or components within it can be upgraded or taken out of service without impacting numerous other surrounding systems. Rather, the accessible or active mailbox for a user is merely shifted to a new multi-role system, typically by designation, which will also contain the necessary protocol server and mailbox server necessary to provide the messaging service to the user.

Affinity occurs naturally in the implementations disclosed herein because the messaging server is selected based on where a user's messages reside, and only that messaging server is involved with a given session for the user. In other words, the messaging client will communicate with a single messaging server during a session, instead of potentially distributing functions of the messaging server across several messaging servers. For example, sending and receiving functions will both be handled by the same messaging server, instead of distributing sending and receiving onto separate messaging servers.

In addition, the messaging server and the content server are both hosted by, or even stored internally to, the same multi-role system as where the client's message database is hosted or stored, improving affinity between the messaging server and the content server. Just as the client need only communicate with one messaging server, likewise the content server need only communicate with the same messaging server. In fact, the messaging server, content server, and message database may be stored on the same physical disk or memory apparatus, or stored in a distributed fashion across multiple storage devices. Thus, affinity is naturally enforced since many communications involving the protocol and mailbox elements will necessarily remain internal to the selected multi-role system.

Some implementations may also provide load balancing functionality within the entry systems that balance workloads across many entry servers within the entry systems. In addition, for any given operation or connection, different load balancers and different entry serves may be utilized, since affinity between the messaging servers and the content servers will occur within the multi-role systems. In this manner, clients will be provided with highly available and highly reliable access to messaging services.

FIGS. 1-3 are provided to illustrate one implementation of a messaging service and its operation. FIG. 1 depicts the elements of messaging system 100, while FIG. 2 illustrates process 200 that describes the operation of messaging system 100. FIG. 3 is a sequence diagram that illustrates in more detail the interaction of the elements of messaging system 100.

Referring now to FIG. 1, illustrated is messaging system 100. Messaging system 100 includes client 111 and client 113 operated by user 101 and user 103 respectively to obtain access to and use a messaging service provided by the various elements of messaging system 100. Upon invocation of the messaging service, name system 115 directs clients 111 and 113 to any of entry system 121, entry system 123, and entry system 125. Clients 111 and 113 may be any messaging clients capable of interfacing with name systems, entry systems, and multi-role systems, including desktop-based messaging applications, web-based messaging applications, mobile messaging applications, and any variation or combination thereof.

Entry systems 121, 123, and 125 provide functionality to interface between clients 111 and 113 and any of multi-role system 131, multi-role system 141, and multi-role system 151. For instance, entry systems 121, 123, and 125 may handle client requests and provide network layer functionality, including network security, authentication, and management of address endpoints. Other functionality may also be provided by entry systems 121, 123, and 125, such as connection re-direction and proxy functions. It should be understood that each entry system may be representative of a group of entry servers co-located together within a geographic site. In such a case, a load balancer may be present to balance communications across the entry servers. For example, entry system 125 includes network load balancer (NLB) 126, entry server 127, entry server 128, and entry server 129. It should be understood that more than one network load balancer may be present within entry system 125. Likewise, three entry servers are shown merely for illustrative purposes.

Multi-role systems 131, 141, and 151 include messaging servers 133, 143, and 153 respectively, and content servers 135, 145, and 155 respectively. Messaging servers 133, 143, and 153 interact with their respective content servers 135, 145, and 155 to provide the message service to clients 111 and 113, as will be discussed in more detail below.

In particular, messaging servers 133, 143, and 153 may be any severs capable of engaging in common messaging functions, such as sending and receiving messages. This may involve providing protocol functionality, such accepting connections from and communicating with clients in accordance with various messaging protocols, such as the Post Office Protocol (POP), Internet Message Access Protocol (IMAP), Outlook Web App (OWA), Exchange Control Panel (ECP) or ActiveSync messaging protocols. Messaging servers 133, 143, and 153 may also provide other protocol functionality, such as handling Simple Mail Transfer Protocol (SMPT) or Messaging Application Programming Interface (MAPI) communications. Any variation of these protocols as well as any other protocol may also be supported by messaging servers 133, 143, and 153.

Content servers 135, 145, and 155 may engage in common content store functions, such as hosting message databases, providing message storage, handling messaging policies, managing address books, indexing messages, data protection, and handling records management and retention policies. Content servers 135, 145, and 155 may communicate with messaging servers 133, 143, and 153, but may also communicate with other elements of messaging system 100, such as clients 111 and 113. In general, content servers 135, 145, and 155 access messages stored within message databases 137, 147, and 147 on behalf of requesting entities, such as messaging servers 133, 143, and 153.

It should be understood that the large scale at which messaging system 100 could be deployed may involve tens if not hundreds of millions of users. Thus, messaging system 100 may be scaled to involve as many name systems, entry systems, and multi-role systems as required to facilitate messaging services at a very large scale. FIG. 1 depicts a limited number of clients, name systems, entry servers, multi-role systems, and other elements merely for purposes of clarity.

The following will now discuss the implementation of process 200 in FIG. 2. Beginning with step 201, an entry system is selected based on client location. For instance, client 111 or 113 may communicate with name system 115 to invoke the messaging service. Name system 115 then selects one of entry system 121, 123, and 125 and directs the initiating client to the selected entry system. It is possible to identify more than one entry system to the client in the event that the primary entry system is unavailable the client can gain access by way of another entry system. In this example, entry system 121 is selected for client 111 and entry system 125 is selected for client 113. Directing the initiating client to the selected entry system may include identifying the network load balancer to the initiating client.

Once in communication with a network load balancer, the initiating client is directed to an available entry server at step 203. For instance, with respect to client 113, network load balancer 126 may select any of entry servers 127, 128, and 129 depending on a variety of factors, such as the load allocated to each entry server, the health of each entry server, and possibly other factors. It is assumed for exemplary purposes that network load balancer 126 has selected entry server 127. It should be understood that that a network load balancer (not shown) within entry system 121 may provide the same functionality with respect to client 111 by identifying any of a number of entry servers (not shown) within entry system 121. However, it should also be understood that the architecture provided with respect to entry system 125 is merely optional. For instance, network load balancers and multiple entry servers are optional and need not be implemented within every entry system.

At step 205, the selected entry server identifies a multi-role system based on where a message database resides that will be associated with a user. A message database resides where it is physically stored, such as on a disk or disk array, or some other type of storage device or memory apparatus within a multi-role system.

For example, any of entry system 121, 123, and 125, or the sub-systems or severs within them, can select any of multi-role systems 131, 141, and 151 depending upon where the message database linked to the requesting user is stored. The association between users and message databases may be determined based on user identities, client identities, and the like, and may be influenced based on the state of each database or multi-role system on which it resides. In this example, it is assumed that message database 147 is associated with user 101, while message database 157 is associated with user 103. Accordingly, multi-role system 141 is selected for client 111 and multi-role system 151 is selected for client 113.

Once the multi-role system has been selected, step 207 calls for maintaining affinity between the selected messaging server, content server, and the messaging client. Initially, this is accomplished by the selection of a multi-role system that includes the content server attached to the active message database for the subject user. Since each multi-role system also includes a messaging server, affinity between the messaging server and the client is also provided. In other words, by providing both a messaging server and a content server within a single system entity—the multi-role system—affinity between the client and the messaging and content servers that provide the message service occurs effortlessly. This is because the messaging server is selected based on the location of active message database for the user. Note that the active message database may sometimes be understood to contain the active mailbox for a user, and thus the multi-role system may be considered to be selected based on the location of the active mailbox. In addition, in some environments the term message database is used synonymously with mailbox. In either case, the location of the user's active message database or mailbox governs which multi-role system is selected.

On an ongoing basis then, affinity is maintained by continuously ensuring that at least both the messaging server function and the content server function are provided within the same physical system as that which stores the active message database for the user. Should the location of active message database change, then so too would which messaging server and which content server are involved in providing the message service to the client, as will be discussed in more detail with respect to FIG. 4A and FIG. 4B.

FIG. 3 provides a sequence diagram to better illustrate the provisioning and delivery of the messaging service discussed above. In particular, FIG. 3 depicts the interaction between client 113, name system 115, entry system 125 (and in particular, network load balancer 126, entry server 127, and entry server 128), and multi-role system 151. Client 113 beings by communicating with name system 115 to invoke an instance of the messaging service. This may be accomplished by identifying the service to name system 115 using a uniform resource locator or some other type of service address.

Name system 115 proceeds to select an entry point based on the location of client 113. It should be understood that more than one entry point may be identified to client 113. Typically, name system 115 attempts to select an entry point that is geographically relevant to the location of client 113. For instance, the relative proximity of an entry system to client 113, compared to the proximity of other entry system, may drive the selection of that entry system. In this example, entry system 125 is chosen over entry system 121 and entry system 123 and name system 115 directs client 113 to it accordingly. Name system 115 may identify entry system 123 to client 113 by referring to a particular network load balancer or group of network load balancers within entry system 123. In this example, it is assumed that network load balancer 126 is identified to client 113.

Having been directed to entry system 125, client 113 proceeds to generate and transfer an access request to network load balancer 126. It should be understood that a single access request is shown here merely for exemplary purposes. It is possible that client 113 may initiate multiple access requests to multiple network load balancers within entry system 125, for example in a round-robin fashion- before ultimately engaging with network load balancer 126. It should also be understood that, while the same network load balancer may be used across several operations or connections attempted by client 113, it is possible that a different network load balancer is available for different operations or connections.

The access request identifies user 103, perhaps by a user identifier, so that entry server 127 can select a multi-role system based on where a message database associated with the user resides. In this example, message database 157, associated with user 103, resides in multi-role system 151. Accordingly, entry server 127 directs the access request to messaging server 153 within multi-role system 151 for further processing. It should be understood that entry server 127 need not perform the step of selecting an appropriate multi-role system in response to every instance of service communications provided by client 113. Rather, the appropriate multi-role system would be identified at least at times when the appropriate multi-role system had not yet been identified.

Messaging server 153 responsively engages with client 113 and handles service communications to provide the messaging service to user 103 Likewise, messaging server 153 may engage with content server 155 as part of providing the messaging service.

As further illustrated in FIG. 3, which entry server is employed to facilitate communications between client 113 and the appropriate multi-role system may change based on loading decisions made by network load balancer 126. For example, while client 113 may initially communicate with multi-role system 151 via entry server 127, subsequently client 113 may be directed to entry server 128. This could occur in response to another access request made by client 113, but could occur in response to other types of communications made by client 113.

Having selected a new entry server, service communications are exchanged between client 113 and entry server 128. Entry server 128 identifies or otherwise selects the appropriate multi-role system with which to communicate based on where a message database associated with user 103 resides, which for purposes of illustration is assumed to have remained multi-role system 151. Accordingly, entry server 128 communicates with multi-role system 151 to facilitate exchange of service communications with client 113. It should be understood that entry server 128 need not perform the step of selecting an appropriate multi-role system in response to every instance of service communications provided by client 113. Rather, the appropriate multi-role system would be identified at least at times when the appropriate multi-role system had not yet been identified.

Figure 4:
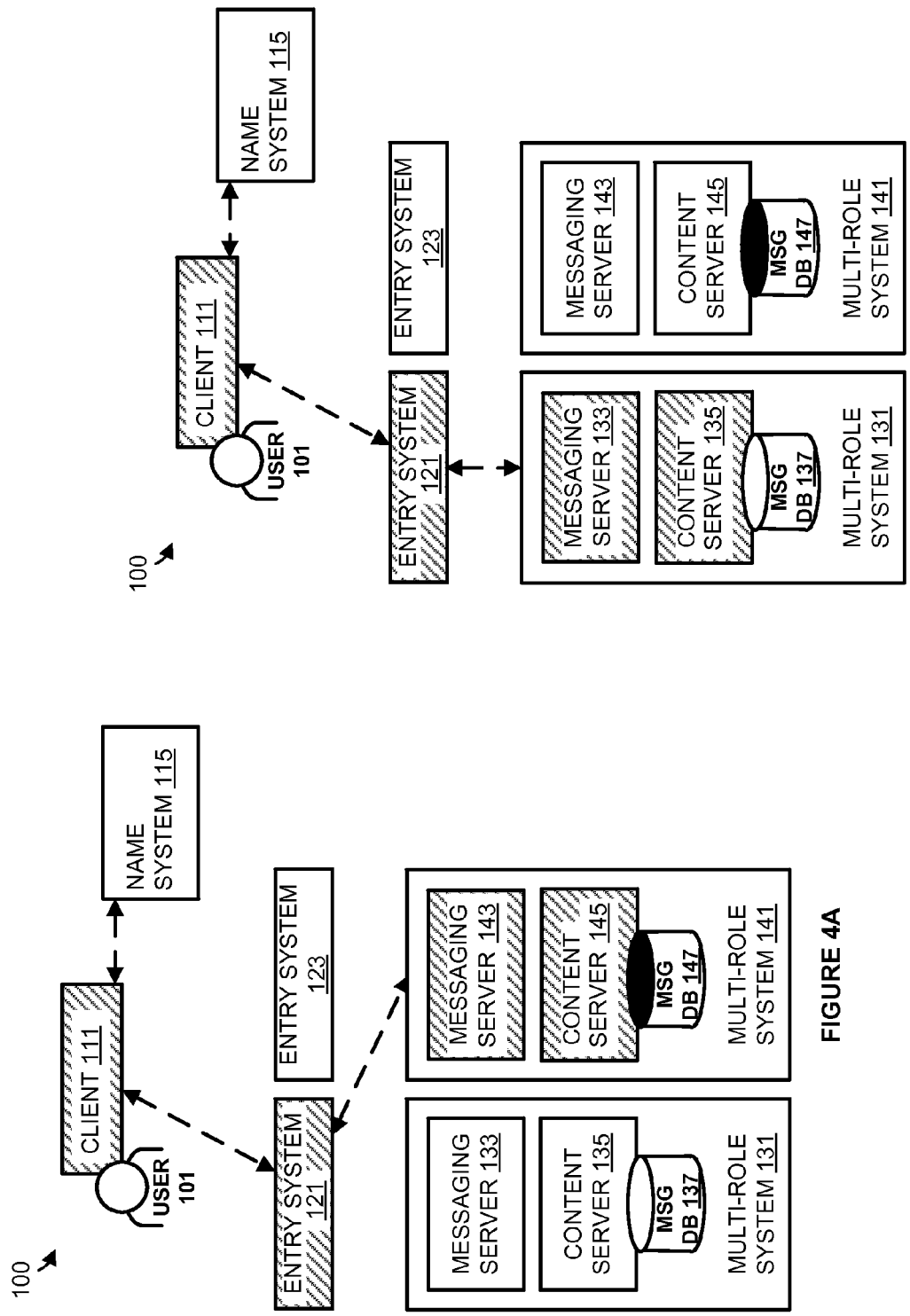
FIGS. 4A and 4B illustrate a changeover between multi-role systems.

FIG. 4A and FIG. 4B illustrate an example whereby a changeover occurs and a passive message database becomes the active message database for a user. This example demonstrates how affinity is enforced by utilizing multi-role systems in which both the content server and the messaging server needed to provide a message service to a client reside.

In FIG. 4A, a portion of messaging system 100 from FIG. 1 is illustrated pertaining to the delivery of the message service to client 111. Message database 147 contains shading to represent that a change has occurred causing the active database designation for user 101 to shift from message database 147 to a different message database. The change may occur due to a failure of message database 147, messaging server 143, content server 145, or any of the underlying components or sub-systems within multi-role system 141. Alternatively, multi-role system 141 may intentionally be brought out of service temporarily to allow for updates or version changes.

In this example, message database 137 is designated as the new active database for user 101 in response to the status change. The designation of message database 137 as the new active database may occur based on any number of factors that are well understood and need not be discussed at length here. One possible factor is the role served by message database 137 as a passive backup to message database 147. It should be understood that, while message databases 137, 147, and 157 are depicted as single database elements, they could be part of a larger data store that may contain other databases, or may themselves contain other databases within.

Turning to FIG. 4B, as a result of the shift in the active designation from message database 147 to message database 137, entry system 121 maintains affinity by directing service communications to multi-role system 131. Within multi-role system 131 reside messaging server 133 and content server 135, which can handle service communications in the context of providing the message service to client 111 and user 101.

It should be understood that redirecting to multi-role system 131 away from multi-role system 141 provides for rapid recovery in the event of failure or servicing of any elements of multi-role system 141. In addition, consistent versioning may be enforced within each multi-role system, such that when a client is redirected to a new multi-role system the elements within the multi-role system will each be of the same version relative to one another. The messaging clients may then be provided with different versions of a service seamlessly since the underlying components of the multi-role systems will be of a consistent version. This means that availability and reliability of the messaging service will increase since interworking between messaging servers and content servers of inconsistent versions is unlikely to occur.

Note that the same entry system 121 is used to direct the communications from client 111. This may be done by redirecting the communications, but entry system 121 may also serve as a proxy. Entry system 121 may be notified of the shift in active designation by content server 145, messaging server 143, or some other element running within multi-role system 141, as well as any other element or process that monitors the state of databases within multi-role systems 131 and 141, and 151. Entry system 121 may itself perform a monitoring process that actively checks on the status of various elements within multi-role systems 131, 141, and 151 so as to maintain the necessary intelligence required to provide affinity between client 111 and client 113 and whichever messaging servers and content servers are involved in providing the messaging service.

Figure 5:
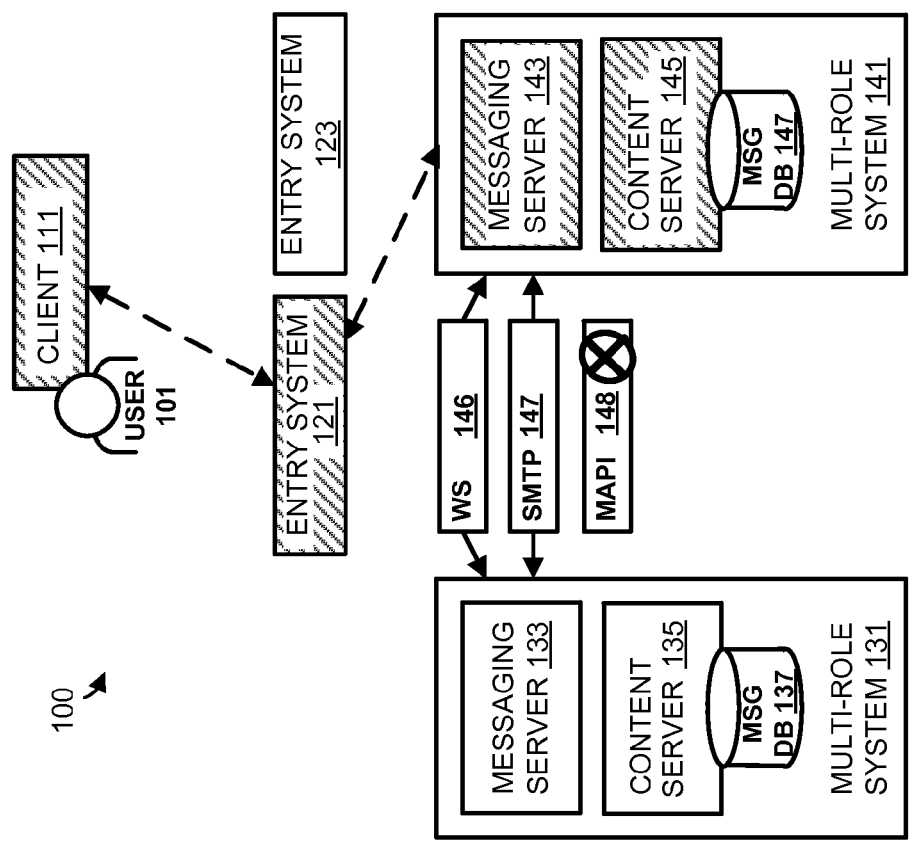
FIG. 5 illustrates communication between multi-role systems in an implementation.

Referring now to FIG. 5, a portion of messaging system 100 from FIG. 1 is illustrated to provide an example of version control between multi-role systems. In particular, FIG. 5 illustrates a scenario whereby user 101, operating client 111, requires access to multiple message databases. This may occur, for example, when a user has been delegated authority over or access to another person's messages. In such circumstances, the other person's messages may reside within a multi-role system different than the multi-role system within which the primary user's messages reside.

With respect to FIG. 5, client 111 is initially directed through entry system 121 to multi-role system 141, as discussed at length above. For most operations, such as sending and receiving email on behalf of user 101, client 111 needs access to message database 147, and thus no intercommunication between multi-role systems is required. However, client 111 may wish to interact with items stored within message database 137, such as email or calendar entries associated with another person.

When such a scenario is triggered, messaging server 143 may attempt to establish a connection or otherwise communicate with messaging server 133. For example, messaging server 143 may attempt to initiate communications by way of any number of protocols, such as the web services (WS) 146, SMTP 147, or MAPI protocols. However, versioning control can be enforced by limiting which protocol is used to communicate between multi-role systems. In this example, the WS 146 and SMTP 147 protocols are allowed, while MAPI protocol 148 is not allowed.

Which protocols are allowed and which protocols are not allowed may be determined based on a number of factors, such as how well each protocol supports version protection. Version protection ensures that, even if multi-role system are communicating with each other using different versions of the same protocol, communications are likely to be exchanged successfully since later versions will be interoperable with older versions of the protocol. Unfortunately, some protocols are less version-protected than others, which can results in communication failures between systems communicating using different versions of the same protocol. Thus, multi-role system 141, and the sub-systems and servers within it, can be limited from communicating with other multi-role systems via protocols other than those considered acceptable from a version protection standpoint.

Referring still to FIG. 5, once a connection has been successfully established between messaging server 145 and messaging server 133, communications can commence in accordance with commands initiated by user 101 via client 111. For example, user 101 may send or receive messages on behalf of the other person that has delegated control to user 101. In the case of a send or receive operation, messages would flow to or from multi-role system 131 over the established connection with multi-role system 141. Messaging server 143 would send or receive the messages, which would ultimately be communicated to message database 137 and stored on behalf of the delegating user.

Figure 6:
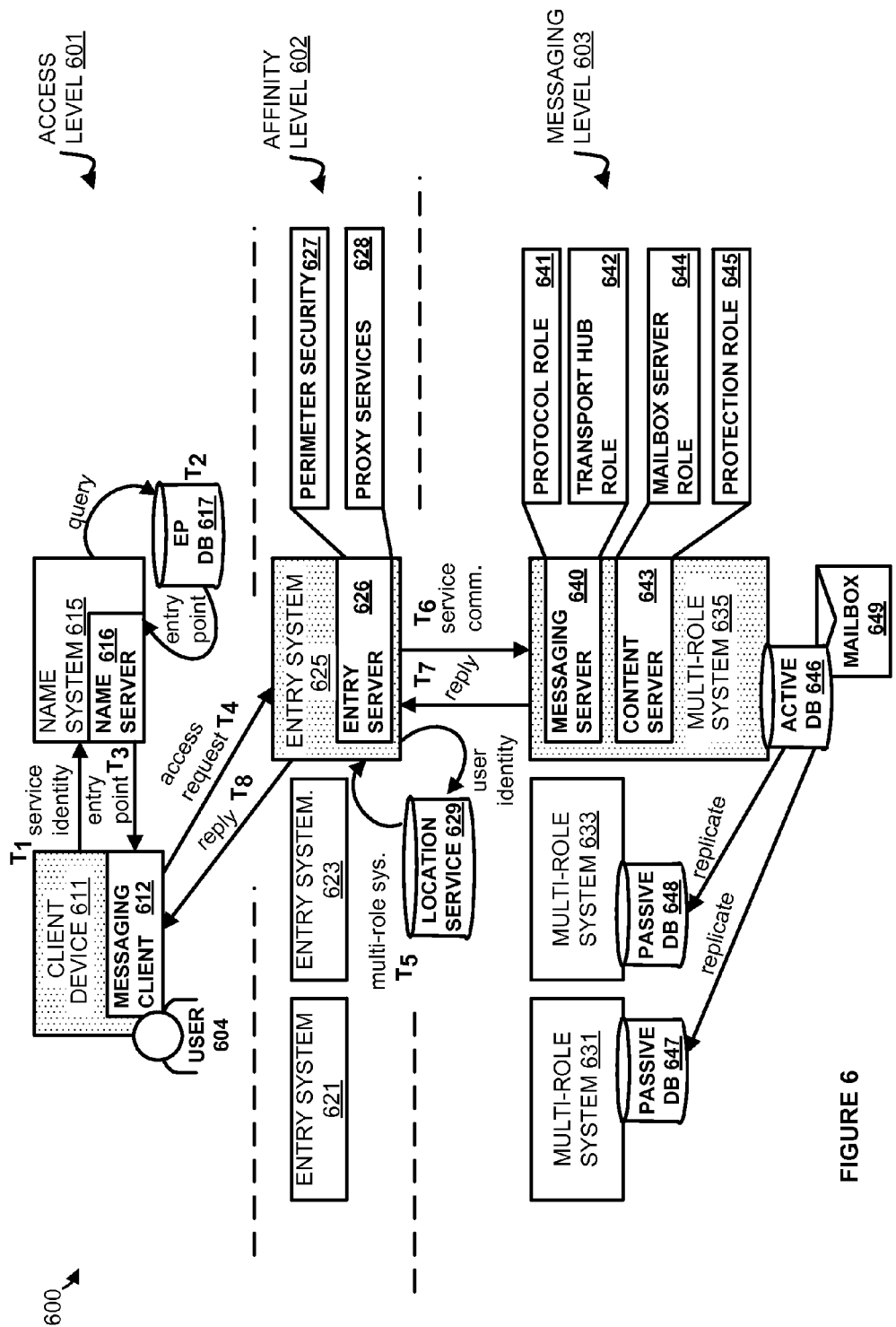
FIG. 6 illustrates a messaging system in an implementation.

FIG. 6 illustrates messaging system 600 and its operation, and in particular describes an implementation of a message service in terms of three levels. The first level, access level 601, includes client device 611 and name system 615. Client device 611 includes messaging client 612 and name system 615 includes name server 616. Access level 601 functions to provide messaging client 612 with access to the second level, or affinity level 602, by way of name server 616. Name server 616 interacts with entry point database 617 to resolve service requests made by messaging client 612 on behalf of user 604.

Affinity level 602 includes entry system 621, entry system 623, and entry system 625. Entry systems 621, 623, and 625 interface between messaging client 612 and any of multi-role system 631, multi-role system 633, and multi-role system 635 to handle client requests and provide network layer functionality, including network security, authentication, and management of address endpoints. Entry systems 621, 623, and 625 may provide other functionality, such as connection re-direction and proxy functions. It should be understood that each entry system may be representative of a group of entry systems co-located together within a geographic site. In such a case, a load balancer may be present to balance communications across the entry systems.

Affinity level 602 functions to maintain session affinity between messaging client 612 and messaging level 603. This is accomplished by determining the targeted mailbox for a user and directing access, either by redirect or proxy, to the appropriate multi-role system hosting the mailbox. If a load balancer is present, affinity in the load balancer need only occur at the network or transport level since each entry server within a group of servers behind the load balancer will examine and direct client communications independently, rather than depending upon state-full mechanisms or interaction with any other entry servers.

While illustrated only with respect to entry system 625, each entry system includes an entry server, such as entry server 626. Entry server 626 interacts with location service 629 in messaging level 603 to service access requests and other service communications initiated by messaging client 612 running on client device 611. Examples of roles performed by entry server 626 include perimeter security role 627 and proxy services role 628. Entry server 626 maintains affinity between messaging client 612 and messaging level 603, as will be discussed in more detail below.

Messaging level 603 includes multi-role systems 631, 633, and 635, which include messaging servers and content servers. By way of example, multi-role system 635 includes messaging server 640 and content server 643. Messaging server 640 interacts with entry server 626, content server 643, and messaging client 612 to provide the messaging service to user 604. Messaging server 640, content server 643, and active database 646 may be stored on the same physical disk or memory apparatus within multi-role system 635, or stored in a distributed fashion across multiple storage devices within multi-role system 635. Thus, affinity is enforced naturally since many communications involving mailbox 649, messaging server 640, and content server 643 will remain internal to multi-role system 635.

Examples of roles performed by messaging server 640 include protocol server role 641 and transport hub role 642. Messaging server 640 provides common messaging functions, such as sending and receiving messages. Messaging server 640 generally performs protocol functions, such as accepting connections from and communicating with clients in accordance with various messaging protocols, such POP, IMAP, or ActiveSync. Messaging server 640 may provide other protocol functionality, such as handling SMTP or MAPI traffic.

Examples of roles performed by content server 643 include a mailbox server role 644 and a protection role 645. Mailbox server role 644 may function to host message databases, provide message storage, handle messaging policies, manage address books, index messages, and handle records management and retention policies. Mailbox server role 644 may communicate with messaging server 640 and may also communicate with other elements of messaging system 600, such as client 611. Messaging server 640 operates on active database 646 through content server 643. Active database 646 includes mailbox 649 associated with user 604. Active database 646 can be replicated to corresponding passive databases 647 and 648, as governed by protection role 645.

It should be understood that FIG. 6 depicts a limited number of clients, name systems, entry servers, multi-role systems, and other elements merely for purposes of clarity. Messaging system 600 may be deployed at a very large scale involving tens or hundreds of millions of users. Thus, messaging system 600 can be scaled to accommodate as many name systems, entry system, and multi-role systems as required to facilitate messaging services at such scale. An example of a message service is Microsoft® Exchange.

Now referring to the sequences illustrated in FIG. 6, the following will discuss the operation of messaging system 600 in an example. Beginning at time $T_1$, messaging client 612 invokes the messaging service by transferring a request that includes the identity of the service to name server 616 running on name system 615. For instance, messaging client 612 may transfer a uniform resource locator that specifies an address for the messaging service, such as www.outlook.com. The request may also identify messaging client 612 or client device 611 in some manner that allows name server 616 to determine their location.

Name server 616 can then query entry point database 617 at time $T_2$ for an appropriate entry point that is determined based on the location of messaging client 612. For example, the network address assigned to messaging client 612 or client device 611 may be resolvable to a physical location or geographic area. Alternatively, entry point database 617 may simply associate various entry points with various ranges of network addresses that are provisioned based on known location characteristics.

At time $T_3$ name server 616 directs messaging client 612 to communicate with the selected entry system, which in this example is assumed to be entry system 625. Name server 616 may return a single entry point to messaging client 612. Optionally, name server 616 may provide messaging client 612 with a list of multiple entry points. Messaging client 612 can then attempt to access each entry point as necessary, thereby providing access redundancy to messaging client 612.

Once directed to an appropriate entry system, messaging client 612 at time $T_4$ transfers an access request to entry server 626 to obtain access to the messaging service. The access request or other communications commensurate with it identify user 604 to entry server 626. Entry server 626 queries location service 629 at time $T_5$ with the identity of user 604 to determine where among multi-role systems 631, 633, and 635 an active database associated with user 604 resides. Location service 629 returns the identity of the proper multi-role system associated with the active database for user 604, which in this case is multi-role system 635, within which resides active database 646.

Location service 629 may communicate with other elements within messaging level 603 to determine and store the identity of multi-role systems in association with which active or passive databases are contained within them. This information can be updated to reflect changes that occur. For instance, one active database that resides in one multi-role server may fail, or other components of the multi-role server may fail. In response, a corresponding passive database can be elected or designated as the new active database. Location service 629 would then be updated to indicate that a new multi-role system is associated with the new active database. It should be noted that location service 629 may, instead of or in addition to storing the identity of multi-role systems in association with messaging systems, store the identity of particular mailboxes, such as mailbox 649, in association with the multi-role systems. Location service 629 may also optionally track the health of multi-role systems 631, 633, and 635 and consider those factors when allocating multi-role systems to clients.

At time $T_6$ entry server 626 directs service communications, including possibly an access request, to messaging server 640, which resides in multi-role system 635. It should be understood that entry server 626 may act as a proxy for communications exchanged between messaging client 612 and multi-role system 635, but may also redirect messaging client 612 to communicate with multi-role system 635.

In any case, messaging client 612 commences to exchange service communications with messaging server 640. Messaging server 640 receives the service communications and handles them in the context of providing the messaging service. For example, messaging server 640 may handle requests by messaging client 612 to send, receive, or otherwise perform messaging operations on messages stored in mailbox 649. Performing these functions may require interacting with content server 643 to obtain information contained in active database 646, such as to retrieve or store individual mail messages. Any responses or replies that may be required of messaging server 640 to messaging client 612 can be transferred and delivered through entry system 625, as shown at times $T_7$ and $T_8$, or possibly communicated directly to messaging client 612.

Turning now to FIG. 7, illustrated is an exemplary computing environment 700 representative of the computing environments in which messaging systems 100 and 600 may be implemented. In particular, computing environment 700 includes client device 711, entry system 725, and multi-role system 735. Client device 711 is representative of any type of client device that may implement a messaging client, such as clients 111 and 113, as well as client device 611. Entry system 725 is representative of entry systems 121, 123, and 125, and entry systems 621, 623, and 625.

Client device 711, entry system 725, and multi-role system 735 may each be any type of computing system capable of performing as described herein for client devices, entry servers, and messaging servers respectively, such as a server computer, client computer, internet appliance, or any combination or variation thereof. Examples of client device 711 include personal computers, mobile phones, and internet appliances, as well as any other type of device capable of running a messaging client. Indeed, client device 711, entry system 725, and multi-role system 735 may each be implemented as a single computing system, but may also be implemented in a distributed manner across multiple computing systems. Client device 711, entry system 725, and multi-role system 735 are provided as examples of general purpose computing systems that, when implementing process 200 discussed with respect to FIG. 2, or otherwise functioning as described for messaging systems 100 and 600, become a specialized messaging system.

Client device 711, entry system 725, and multi-role system 735 have some elements in common, including processing systems 713, 723, and 733, storage systems 714, 724, and 734, and communication interfaces 717, 727, and 737. Client device 711 includes user interface 719, which may optionally be included in entry server 725 and multi-role system 735. User interface 719 may include a mouse, a voice input device, a touch input device, and other comparable input devices and associate processing elements capable of receiving user input from user 701. Output devices such as a display, speakers, printer, and other types of output devices may also be included.

Processing systems 713, 723, and 733 are communicatively coupled with storage systems 714, 724, and 734 respectively. Storage systems 714, 724, and 734 store messaging client 712, entry server 726, messaging server 740, and content server 743 respectively. When executed by processing systems 713, 723, and 733, messaging client 712, entry server 726, messaging server 740, and content server 743 direct client device 711, entry system 725, and multi-role system 735 operate as described herein for messaging systems 100 and 600 and their respective elements.

Referring still to FIG. 7, processing systems 713, 723, and 733 may comprise microprocessors and other circuitry that retrieve and execute messaging client 712, entry server 726, messaging server 740, and content server 743 from storage systems 714, 724, and 734 respectively. Processing systems 713, 723, and 733 may each be implemented within single processing devices but may also be distributed across multiple processing devices or sub-systems that cooperate in executing program instructions. Examples of processing systems 713, 723, and 733 include general purpose central processing units, application specific processors, and logic devices, as well as any other type of processing device.

Storage systems 714, 724, and 734 may comprise any storage media readable by processing systems 713, 723, and 733 respectively and capable of storing messaging client 712, entry server 726, messaging server 740, and content server 743. Storage systems 714, 724, and 734 may include volatile and nonvolatile, removable and non-removable media implemented in any method or technology for storage of information, such as computer readable instructions, data structures, program modules, or other data. Storage systems 714, 724, and 734 may be implemented as single storage devices but may also be implemented across multiple storage devices or sub-systems. Storage systems 714, 724, and 734 may comprise additional elements, such as controllers, capable of communicating with processing systems 713, 723, and 733.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Messaging client 712, entry server 726, messaging server 740, and content server 743 comprise computer program instructions, firmware, or some other form of machine-readable processing instructions having at least portions of process 200 embodied therein. Messaging client 712, entry server 726, and messaging and content servers 740 and 743 may each be implemented as a single application but also as multiple applications. In general, messaging client 712, entry server 726, messaging server 740, and content server 743, when loaded into processing systems 713, 723, and 733 and executed, transform client device 711, entry system 725, and multi-role system 735 from general-purpose computing systems into special-purpose computing systems customized to operate as described for messaging systems 100 and 600 and their associated discussion.

Encoding on media messaging client 712, entry server 726, messaging server 740, and content server 743 may also transform the physical structure of storage systems 714, 724, and 734. The specific transformation of the physical structure may depend on various factors in different implementations of this description. Examples of such factors may include, but are not limited to: the technology used to implement the storage media of storage systems 714, 724, and 734, whether the computer-storage media are characterized as primary or secondary storage, and the like.

For example, if the computer-storage media are implemented as semiconductor-based memory, messaging client 712, entry server 726, messaging server 740, and content server 743 may transform the physical state of the semiconductor memory when the software is encoded therein. For example, messaging client 712, entry server 726, messaging server 740, and content server 743 may transform the state of transistors, capacitors, or other discrete circuit elements constituting the semiconductor memory.

A similar transformation may occur with respect to magnetic or optical media. Other transformations of physical media are possible without departing from the scope of the present description, with the foregoing examples provided only to facilitate this discussion.

Communication interfaces 717, 727, and 737 may each include communication connections and devices that allow for communication between client device 711, entry system 725, and multi-role system 735. Client device 711 communicates with entry system 725 over communication network 707, and may optionally communicate with multi-role system 735 over communication network 707. Entry system 725 and multi-role system 735 communicate over communication network 707. Communication network 707 may be any network or collection of networks capable of carrying communications between client device 711, entry system 725, and multi-role system 735. Examples of connections and devices that together allow for inter-system communication include network interface cards, antennas, power amplifiers, RF circuitry, transceivers, and other communication circuitry. The aforementioned networks, connections, and devices are well known in the art and need not be discussed at length here.

The functional block diagrams, operational sequences, and flow diagrams provided in the Figures are representative of exemplary architectures and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of facilitating a message service the method comprising:
    identifying a multi-role system based on where among a plurality of multi-role systems an active message database associated with a user identity resides, wherein each of the plurality of multi-role systems includes a messaging server and a content server; and
    directing service communications generated by a messaging client associated with the user identity from an entry system to the multi-role system for handling in the multi-role system by a messaging server and a content server included in the multi-role system to provide the message service.

2. The method of claim 1 further comprising, upon a passive message database that resides in a different multi-role system becoming the active database, directing the service communications generated by the messaging client from the entry system to the different multi-role system in which the active message database resides for handling by a messaging server and a content server in the different multi-role system.

3. The method of claim 1 further comprising identifying the entry system based on a location of the messaging client and directing the messaging client to the entry system.

4. The method of claim 1 further comprising limiting communications between the multi-role system and another multi-role system based on version protection characteristics of a plurality of communication protocols with which the multi-role system attempts to communicate with the another multi-role system.

5. The method of claim 4 wherein the active message database comprises a user mailbox associated with the user identity.

6. The method of claim 1 wherein the messaging service comprises an email service.

7. The method of claim 1 wherein the messaging service comprises a unified communications service.

8. One or more computer readable storage media having program instructions stored therein for facilitating a message service that, when executed by one or more processing systems, direct the one or more processing systems to:
    identify a multi-role system based on where among a plurality of multi-role systems a message database associated with a user identity resides, wherein each of the plurality of multi-role systems includes a messaging server and a content server;
    direct service communications initiated by a messaging client associated with the user identity to the multi-role system for handling by a messaging server and a content server in the multi-role system.

9. The one or more computer readable storage media of claim 8 wherein the program instructions, when executed by the one or more processing systems, further direct the one or more processing systems to:
    in response to a passive message database that resides in a different multi-role system becoming the active database, direct the service communications generated by the messaging client to the different multi-role system in which the active message database resides for handling by a messaging server and a content server in the different multi-role system.

10. The one or more computer readable storage media of claim 8 wherein the program instructions, when executed by the one or more processing systems, further direct the one or more processing systems to:
    responsive to the messaging client invoking the message service, identify an entry system based on a location of the messaging client; and
    direct service communications initiated by the messaging client to the entry system.

11. The one or more computer readable storage media of claim 8 wherein the program instructions include the messaging server and the content server, and wherein the messaging server comprises a protocol server role and a transport hub role, and wherein the content server comprises a mailbox server role.

12. The one or more computer readable storage media of claim 8 wherein the messaging service comprises an email service.

13. The one or more computer readable storage media of claim 12 wherein the active message database includes a mailbox associated with the user identity.

14. The one or more computer readable storage media of claim 8 wherein the messaging service comprises a unified communications service.

15. A messaging system for facilitating a message service, the messaging system comprising:
    an entry system configured to identify a multi-role system based on where among a plurality of multi-role systems a message database associated with a user identity resides and direct service communications generated by a messaging client associated with the user identity to the multi-role system, wherein each of the plurality of multi-role systems includes a messaging server and a content server; and a messaging server and a content server included in the multi-role server and configured to handle the service communications to provide the message service.

16. The messaging system of claim 15 wherein the entry system is further configured to, upon a passive message database that resides in a different multi-role system becoming the active database, direct the service communications generated by the messaging client from the entry system to the different multi-role system in which the active message database resides for handling by a messaging server and a content server in the different multi-role system.

17. The messaging system of claim 15 further comprising a name system configured to identify the entry system based on a location of the messaging client and direct the service communications from the messaging client to the entry system.

18. The messaging system of claim 15 wherein the messaging server comprises a protocol server role and a transport hub role, and wherein the content server comprises a mailbox server role.

19. The messaging system of claim 15 wherein the messaging service comprises an email service and wherein the active message database comprises a user mailbox associated with the user identity.

20. The messaging system of claim 15 wherein the messaging service comprises a unified communications service.

* * * * *